United States Patent [19]

Bocci et al.

[11] Patent Number: 5,491,688
[45] Date of Patent: Feb. 13, 1996

[54] METHOD FOR PROVIDING A FAVORABLE SIGNAL REPRESENTATION

[76] Inventors: Paul Bocci, 23W732 W. Pine Ave., Roselle, Ill. 60172; Lawrence E. Feldman, 1549 Bunescu, Buffalo Grove, Ill. 60089

[21] Appl. No.: 270,974

[22] Filed: Jul. 5, 1994

[51] Int. Cl.[6] .......................... H04J 13/00; G06F 11/00
[52] U.S. Cl. .............................. 370/18; 371/2.1; 371/36; 371/37.1
[58] Field of Search ...................... 370/13, 17, 18, 370/85.6, 95.1, 99, 110.1, 112; 375/200, 205, 206; 371/2.1, 36, 37.1, 37.4, 41; 455/38.1, 53.1, 54.1, 56.1, 66, 67.1, 67.3; 340/825.44, 825.5, 825.51; 341/94; 381/29, 30

[56] References Cited

U.S. PATENT DOCUMENTS

| | | | |
|---|---|---|---|
| 4,648,091 | 3/1987 | Gajjar | 371/37.1 |
| 4,791,643 | 12/1988 | Molstad et al. | 371/39.1 |
| 5,285,454 | 2/1994 | Blaum et al. | 371/37.1 |
| 5,365,525 | 11/1994 | Newberg et al. | 371/2.1 |
| 5,396,503 | 3/1995 | Thaler et al. | 370/18 |

*Primary Examiner*—Alpus Hsu
*Attorney, Agent, or Firm*—Christopher P. Moreno

[57] ABSTRACT

Signal sources provide frames (302–303) to a comparator (206). For each frame, codeword error statuses for each of the codewords and a frame error status (313–314) are determined. Codeword error statuses are provided for priority sets of codewords (306, 308) and are not provided for non-priority sets of codewords (311, 312). The codeword error statuses for members of the priority set of codewords for each frame are compared, wherein the members have substantially identical codeword identifications. Selected priority codewords are produced by selecting members of the priority sets having favorable codeword statuses. Furthermore, the frame error statuses for each frame are also compared. Selected non-priority codewords are produced by selecting the non-priority set of codewords corresponding to a favorable frame error status. The selected priority codewords and the selected non-priority codewords are then provided as the favorable signal representation (304). Alternatively, only frame error statuses may be provided.

17 Claims, 6 Drawing Sheets

METHOD FOR PROVIDING A FAVORABLE SIGNAL REPRESENTATION

FIELD OF THE INVENTION

Generally, the present invention relates to communication systems and, in particular, to a method for providing a favorable signal representation.

BACKGROUND OF THE INVENTION

The use of comparators, and their associated voting algorithms, within digital wireless communication systems is known. In general, a comparator, operably coupled to a plurality of base stations or satellite receivers located in geographically diverse areas, attempts to select or construct a favorable representation of an audio signal given multiple sources of the signal (i.e., the base stations). This is accomplished by comparing the signals received from the signal sources and selecting, from amongst all of the signal sources, portions of the signal having the best signal quality. The selected portions are then reassembled to produce the favorable signal representation. The favorable representation can then be retransmitted, thereby increasing the probability of good reception (i.e., intelligibly decoded audio) at the signal destination.

Within such digital communication systems, audio signals are typically represented as streams of compressed digital data. For example, current ASTROTAC™ comparators by Motorola, Inc. utilize compressed digital audio parsed into 30 ms. frames, each frame comprising six codewords. Thus, while it is possible to perform the necessary comparisons using well-known quality indicators such as signal-to-noise ratios (SNR), the direct comparison of digital data streams is also possible. As a result, digital comparators (e.g., ASTROTAC™) are known to use codeword voting to determine the signal best suited for retransmission.

Figure 1:
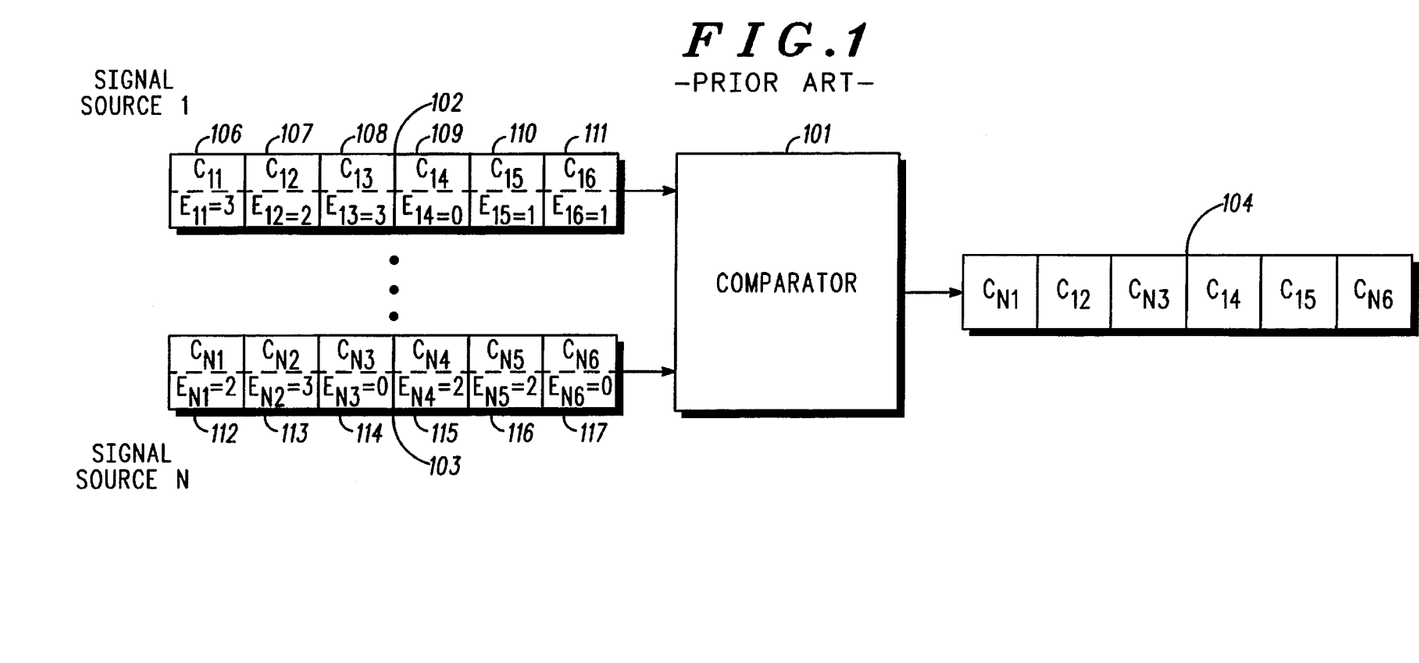
FIG. 1 illustrates an example of codeword voting as performed in prior art comparators.

FIG. 1 illustrates an example of codeword voting as performed in prior art comparators. As shown, a comparator (101) receives frames (102–103) from N different signal sources (only two shown), such as base stations and/or receivers. The frames (102–103) ideally correspond to identical portions of a transmitted signal. Each of the frames (102–103) comprises six codewords (106–117), identified for clarity as $C_{ij}$, where i indicates the signal source and j indicates the codeword position within the frame. Furthermore, each codeword (106–117) also includes a codeword error status, labeled as $E_{ij}$. Typically, the codeword error statuses are determined by the base stations/receivers and sent to the compartor. In FIG. 1, it is assumed that each error status represents the number of bit errors detected in their respective codewords (106–117). As a result, a codeword having the lowest error status (i.e., fewer bit errors) is assumed to be the least corrupt and representative of the best possible audio quality.

According to the prior art method, the comparator (101) compares all codewords (106–117), based on their respective codeword error statuses, having equivalent identifications (frame positions). Thus, all codewords $C_{i1}$, for i=1 to N, are compared based on their error statuses, $E_{i1}$. In the example shown, $E_{N1} < E_{11}$ and $C_{N1}$ is thus selected by the comparator (101) for use in the favorable signal representation (104). Using the same procedure, $C_{12}$, $C_{N3}$, $C_{14}$, $C_{15}$ and $C_{N6}$ are also selected. This process is repeated each time a new set of frames is input to the comparator (101).

The above-described method works well from an audio quality point of view in that voting occurs on each small segment of the signal (i.e., the codewords). A limitation of this method, however, is the amount of throughput required to send the codeword error statuses to the comparator. For example, 30 ms. frames that include 14 codeword error status bits require a throughput rate of 466.7 bits per second for the codeword error status bits alone. If the frame rate or the number of bits used for the error statuses increases, the required throughput rate is increased. For example, the Association of Public Safety Communication Officers (APCO) has created a standard specifying 20 ms. frames. In order to achieve compliance with this standard, either more throughput capacity is needed to send the same number of error status bits or less error status bits can be sent. Since the throughput rates of the links connecting the signal sources to the comparator (e.g., telephone lines) are typically limited, the first alternative is generally not viable. However, if the number of error status bits per frame is decreased, the resulting codeword error statuses may not be able to provide accurate measurements of each codeword's quality. Therefore, the need exists for a method that allows a digital compartor to provide a favorable signal representation based on fewer error status bits, and yet provide suitable audio quality.

DESCRIPTION OF A PREFERRED EMBODIMENT

Generally, the present invention provides a method, in a digital wireless communication system, for providing a favorable signal representation given a plurality of signal sources. The signal sources provide frames, which frames comprise a plurality of codewords having codeword identifications. For each frame, codeword error statuses are determined for each of the codewords. In addition, a frame error status for the entire frame is also determined.

In a first embodiment of the present invention, a priority set of codewords and a non-priority set of codewords are identified for each frame, wherein the codeword error statuses are provided for the priority set of codewords and the codeword error statuses are not provided for the non-priority set of codewords. The codeword error statuses for members of the priority set of codewords for each frame are compared, wherein the members have substantially identical codeword identifications. Selected priority codewords are produced by selecting members of the priority sets having favorable codeword statuses. Furthermore, the frame error statuses for each frame are also compared. Responsive to comparing the frame error statuses, selected non-priority codewords are produced by selecting the non-priority set of codewords corresponding to a favorable frame error status. The selected priority codewords and the selected non-priority codewords are then provided as the favorable signal representation.

In a second embodiment of the present invention, the frame error statuses for each frame are compared and the plurality of codewords corresponding to a favorable frame error status are provided as the favorable signal representation. Using either of the above-described methods, a favorable signal representation may be provided more efficiently than with prior art methods.

Figure 2:
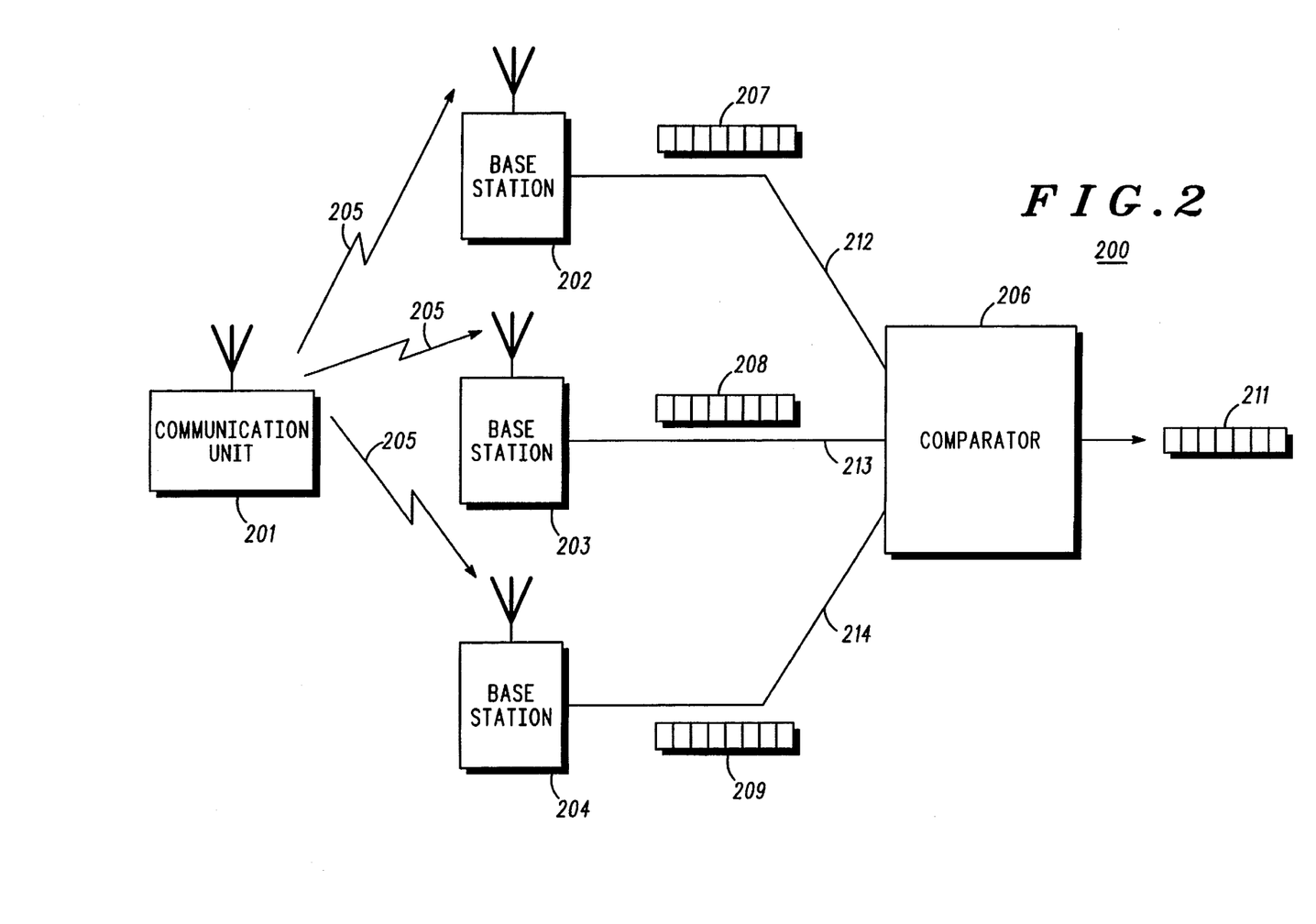
FIG. 2 illustrates an exemplary wireless communication system that may be adapted for use with the present invention.

The present invention can be more fully described with reference to FIGS. 2–6. FIG. 2 illustrates a digital wireless communication system (200) that may be adapted for use with the present invention. The digital wireless communication system (200) includes at least one communication unit (201), a plurality of base stations (202–204), and a comparator (206). The communication unit (201), which can be an ASTRO™ portable radio by Motorola, Inc., provides voice communications in the form of compressed digital audio. The base stations (202–204), which can be ASTRO™ QUANTAR™ base stations by Motorola, Inc., receive the compressed digital audio sent by the communication unit (201). The comparator (206), which can be an ASTROTAC™ comparator by Motorola, Inc. modified for use with the present invention, chooses a favorable signal representation from the plurality of signal representations provided by the base stations (202–204).

The system (200) nominally works as follows: the communication unit (201) transmits compressed digital audio via the wireless communication resources (205), which may comprise radio frequency (RF) channels such as pairs of frequency carriers, time division multiplexed (TDM) slots, or any other RF transmission media, to the base stations (202–204). The base stations (202–204) then parse the received signal into frames (207–209) comprising codewords, which frames are then sent to the comparator (206) via land-based (e.g., telephone lines) links (212–214). In a preferred embodiment, the frames (207–209), and their constituent codewords, are generated using an Improved Multi-Band Excitation (IMBE™) encoder within the communication unit (201).

In a preferred embodiment, the base stations (202–204) perform error correction processing on each of the codewords to yield codeword error statuses and, subsequently, frame error statuses. For each frame, a portion less than all of the codeword error statuses and the frame error status is sent to the comparator (206). As previously discussed, the limited bandwidth of the land-based links (212–214), as well as the need to transmit other information, typically prohibits the transmission of all of the codeword error statuses and the frame error status for each frame (207–209).

Figure 3:
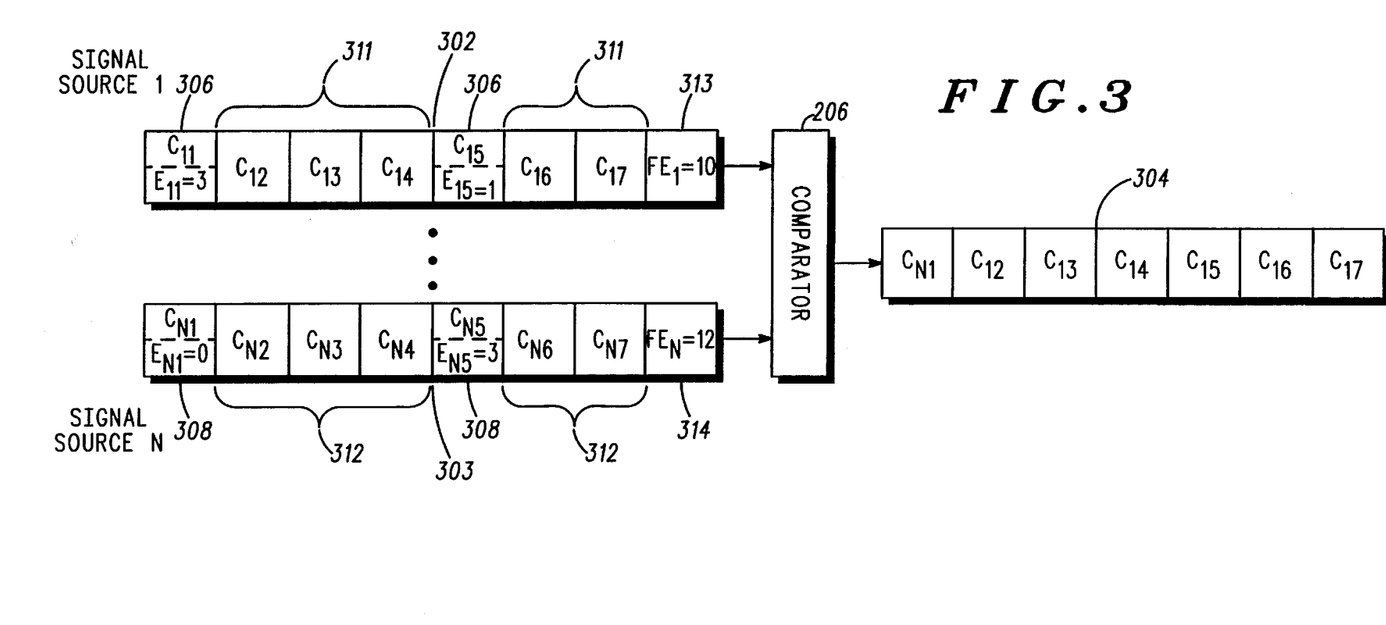
FIG. 3 illustrates an example of a comparator operating in accordance with a first embodiment of the present invention.
Figure 4:
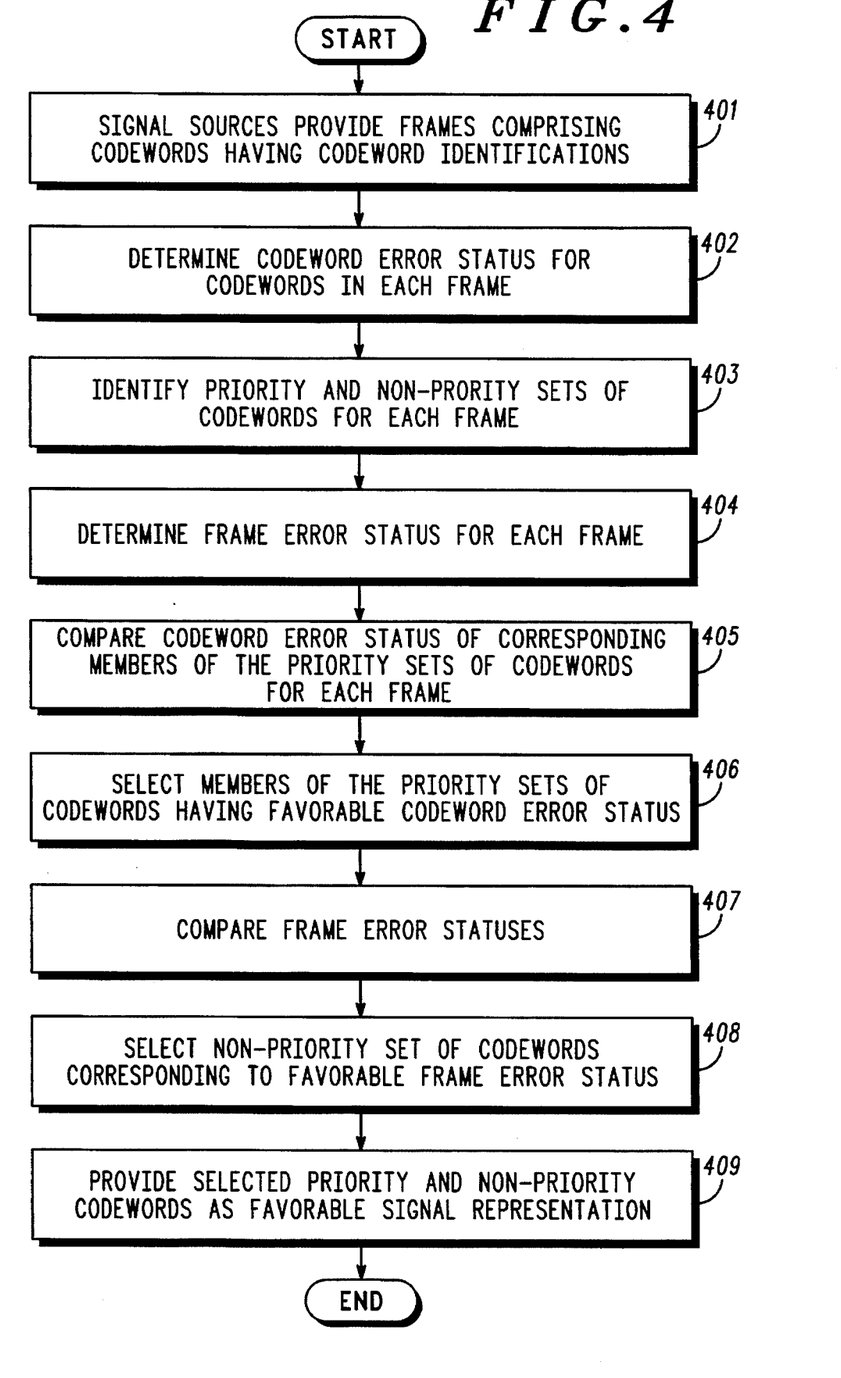
FIG. 4 illustrates a flowchart that may be incorporated to implement a first embodiment of the present invention as shown in FIG. 3.

FIGS. 3 and 4 illustrate a first embodiment of the present invention. In FIG. 3, the comparator (206) is shown receiving as inputs frames (302–303) of the type described above, and producing a favorable signal representation (304). The comparator (206) can accept inputs from N different signal sources, although only two are shown. In order for the comparator (206) to perform a beneficial function, the value of N should be greater than 1, and typically ranges from 8 to 16. In a preferred embodiment, the input frames (302–303) from each signal source comprise 7 codewords, where each codeword belongs to either a priority set (306, 308) or non-priority set (311, 312). The codeword error statuses are provided to the comparator (206) only for members of the priority sets (306, 308). In addition, frame error statuses (313–314) for each input frame (302–303) are provided to the comparator (206). As before, the codewords and codeword error statuses are uniquely identified as $C_{ij}$ and $E_{ij}$, respectfully, where i indicates the signal source and j indicates the codeword position within the frame. Additionally, the frame error statuses are uniquely identified as $FE_i$. It is understood that the codewords, codeword error statuses, and frame error status for each frame (302–303) can be arranged as shown or interleaved, in part or in whole, in any suitable manner as necessary.

Referring now to FIG. 4, a method for providing the favorable signal representation (304) in accordance with the first embodiment is described. At step 401, the frames (302–303) are parsed by the base stations (202–204). Each codeword within the frames (302–303) has a unique codeword identification, as exemplified by the labels $C_{ij}$. In a preferred embodiment, the codeword identifications are inherently defined by virtue of each codeword's position in its frame, although the codeword identifications may be expressly sent as additional information with each codeword.

At step 402, the base stations (202–204) compute the codeword error statuses for the codewords in each frame (302–303). In a preferred embodiment of the present invention, Golay and Hamming codes, as known in the art, are used to protect the codewords from errors introduced during transmission over the communication resources (205). For example, codewords $C_{ij}$ for i=1 to N and j=1 to 4 can be 23 bit Golay codewords; codewords $C_{ij}$ for i=1 to N and j=5 to 7 can be 15 bit Hamming codewords. Thus, the codeword error statuses $E_{ij}$ are the number of bit errors detected for each codeword by the Golay and Hamming error correction algorithms. In FIG. 3, for example, codeword error status $E_{11}$ indicates that 3 errors have been detected in the first codeword from signal source 1. It is understood that some other form may be used for the codeword error statuses. For example, a SNR may be computed for each codeword and provided as the codeword error statuses.

In addition to determining the codeword error statuses, the base stations (202–204) also identify the priority sets (306, 308) and non-priority sets (311, 312) of codewords for each frame (403). This identification can be performed on every new frame, but in practice it is preferable to predetermine the priority sets (306, 308) and non-priority sets (311, 312) based on the frame positions of the codewords. For example, as shown in FIG. 3, all codewords $C_{i1}$ and $C_{i5}$ comprise the priority sets (306, 308) and all remaining codewords comprise the non-priority sets (311, 312). Priority sets of codewords include those codewords having the greatest perceptual weights, where the perceptual weight is a measure of a codeword's impact on audio quality. For example, codewords $C_{i1}$ and $C_{i5}$ have the most negative impact on resulting audio quality when corrupted.

Having computed the codeword error statuses for the codewords in the priority sets (306, 308) and non-priority sets (311, 312), the base stations (202–204) determine (404) the frame error statuses (313–314) for each frame (302–303). The frame error statuses (313–314) may comprise the sum of the codeword error statuses for both the priority (306, 308) and non-priority sets (311, 312), or for the non-priority sets (311, 312) only. For example, assuming a total of 6 errors for the non-priority set (311) corresponding to the frame (302) from signal source 1, the additional 4 errors for the priority set (306) leads to a frame error status (313) of 10.

Regardless of the method used, once the frame error statuses (313–314) have been determined (404), the frames (302–303) comprising the priority sets of codewords (306, 308), the non-priority set of codewords (311, 312), and the frame error statuses (313–314) can be sent to the comparator (206). Owing to a variety of factors, including the relative arrival times of the signal at each of the base stations (202–204), the frames (302–303) are not typically sent to the comparator (206) at precisely the same time. To compensate for this, some determination must be made at the comparator (206) whether or not arriving frames correspond to identical portions of the signal. A method for this determination is described in the U.S. patent application entitled "Method And Apparatus For Determining Signal Sources Within A Diversity Repeater", having Ser. No. 08/002,556, which is incorporated herein as a reference.

Upon receiving the frames (302–303), the comparator (206) compares (405) the codeword error statuses for members of the priority sets (306, 308) having the same codeword identification across all of the frames (302–303). Thus, referring to FIG. 3, the codeword error statuses for all codewords $C_{i1}$ (i=1 to N) are compared. Likewise, the codeword error statuses for all codewords $C_{i5}$ are also compared.

Responsive to the comparisons of step 405, those members of the priority sets of codewords (306, 308) having favorable codeword error statuses are selected (406). Assuming that error correction codes (e.g., Golay and Hamming codes) are used to produce the codeword error statuses, favorable codeword error statuses are those statuses indicating the lowest number of errors in their respective codewords. If another method is used to determine the codeword error statuses, this should be reflected in the selection of a favorable codeword error status, e.g., selecting the highest SNR. Referring again to the example shown in FIG. 3, codeword error status $E_{N1}$ is less than $E_{11}$, thus codeword $C_{N1}$ is chosen as a selected priority codeword. Similarly, codeword error status $E_{15}$ is less than $E_{N5}$, thus codeword $C_{15}$ is also chosen as a selected priority codeword. When two or more corresponding codewords from the priority sets (306, 308) have equally favorable codeword error statuses (i.e., have the lowest number of errors), any of a number of selection criteria may be used. In a preferred embodiment, this situation is resolved by selecting that codeword from the frame with the smallest frame error status. For example, if $E_{11}$ and $E_{N1}$ were both 0, $C_{11}$ would be selected because its corresponding frame error status $FE_1$ is less than $FE_N$.

At step 407, the frame error statuses (313–314) are for each frame (302–303) are compared. This comparison of frame error statuses-is independent from the comparisons used to resolve the occurrence of equally favorable codeword error statuses previously discussed. Responsive to the comparisons of the frame error statuses (313–314), the non-priority sets of codeword corresponding to a favorable frame error status is selected (408). Assuming once again that error correction codes are used to produce the codeword error statuses, and hence the frame error statuses, a favorable frame error status is that status indicating the lowest number of errors in its respective frame. Referring yet again to FIG. 3, codewords from the non-priority set (311) of signal source 1 are chosen as selected non-priority codewords because their corresponding frame error status $FE_1$ is the most favorable. When two or more frames have equally favorable frame error statuses, the selection of the non-priority codewords can be arbitrary.

Once the selected priority and selected non-priority codewords have been determined, the comparator (206) can provide (409) the selected priority and selected non-priority codewords as the favorable signal representation (304). It is again understood that the selected priority and selected non-priority codewords included in the favorable signal representation (304) may be arranged as shown or interleaved, in part or in whole, in any suitable manner as necessary. Because codeword error statuses are provided only for the priority sets of codewords (306, 308), and that the frame error statuses (313–314) encompass the error information for the remaining non-priority codewords in a fewer number of bits, the present invention conserves bandwidth in comparison with prior art methods. Any negative impact to audio quality as a result of this reduction in error statuses is minimized because those codewords having the greatest perceptual weight are still selected based on their individual error statuses.

Figure 5:
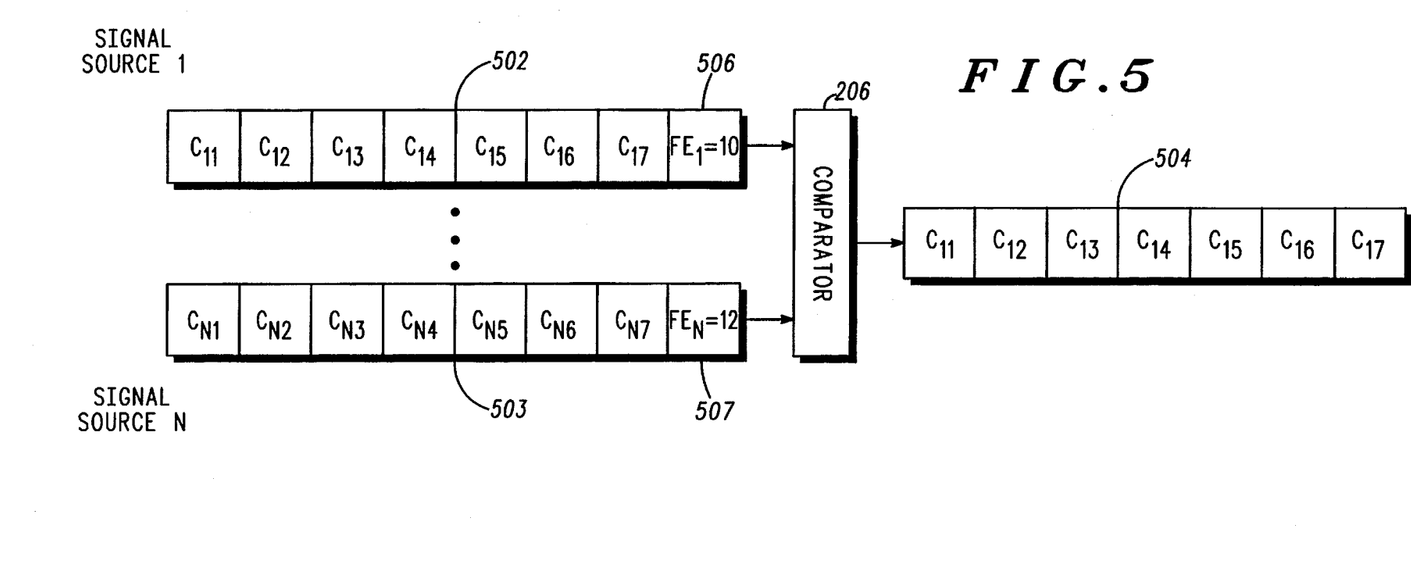
FIG. 5 illustrates an example of a comparator operating in accordance with another embodiment of the present invention.
Figure 6:
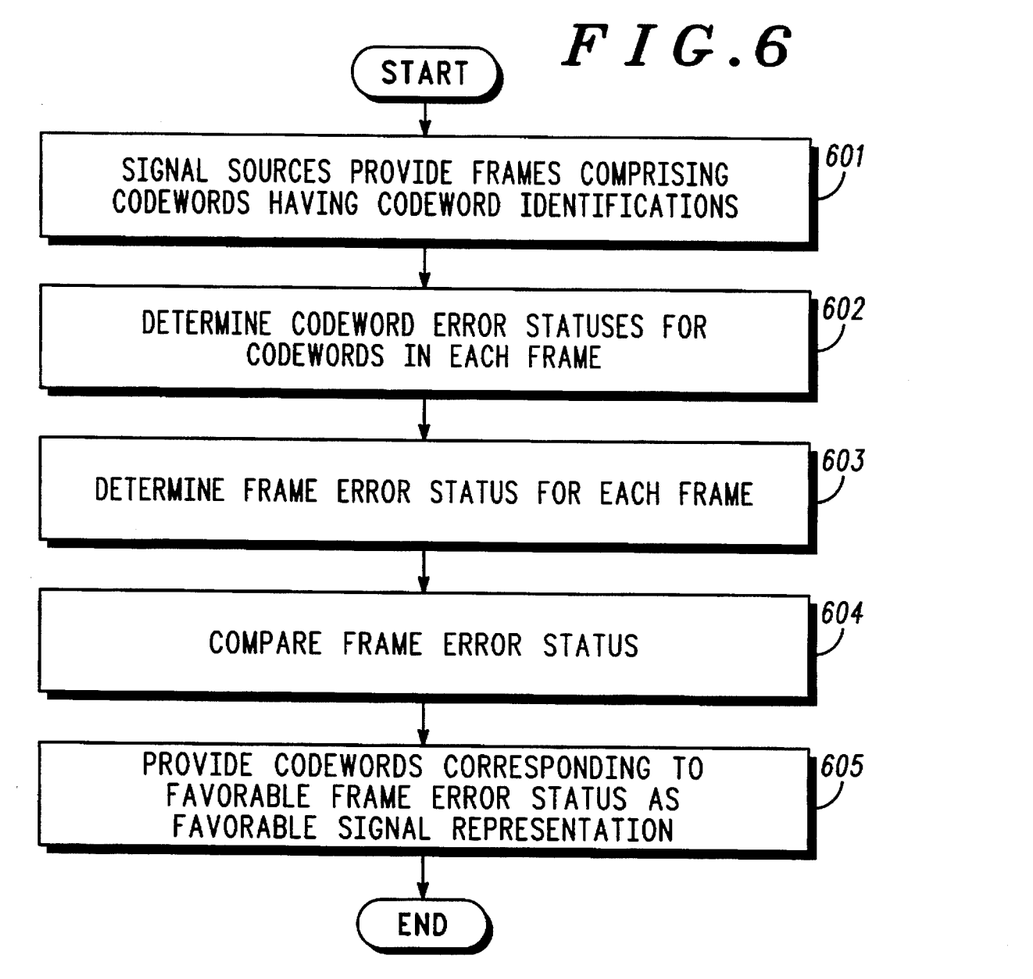
FIG. 6 illustrates a flowchart that may be incorporated to implement a first embodiment of the present invention as shown in FIG. 5.

FIGS. 5 and 6 illustrate a second embodiment of the present invention. In FIG. 5, the comparator (206) is shown receiving as inputs frames (502–503) of the type described above, and producing a favorable signal representation (504). In contrast to the first embodiment described with reference to FIGS. 3 and 4, codeword error statuses are calculated but are not sent to the comparator (206). However, the frame error statuses (506–507) are calculated and provided in essentially the same manner as described above.

Referring now to FIG. 6, a method for providing the favorable signal representation (504) in accordance with the second embodiment is described. At step 601, the frames (502–503) are parsed by the base stations (202–204). Each codeword within the frames (502–503) has a unique codeword identification, as exemplified by the labels $C_{ij}$.

At step 602, the base stations (202–204) compute codeword error statuses (none shown) for the codewords in each frame (502–503). As before, Golay and Hamming are used in a preferred embodiment to protect the codewords and it is understood that some other form may be used for the codeword error statuses. For example, a SNR may be computed for each codeword and provided as the codeword error statuses.

Having computed the codeword error statuses for each frame (502–503), the base stations (202–204) determine (603) the frame error statuses (506–507) for each frame (502–503). In the second embodiment, the frame error statuses (506–507) comprise the sum of the codeword error statuses for their respective frames (502–503).

Once the frame error statuses (506–507) have been determined, the frames (502–503), comprising their respective codewords and frame error statuses (506–507), can be sent to the comparator (206). Upon receiving the frames (502–503), the comparator (206) compares (604) the frame error statuses (506–507). Responsive to the comparisons of the frame error statuses (506–507), the codewords corresponding to a favorable frame error status are provided (605) as the favorable signal representation (504). Assuming once again that error correction codes are used to produce the codeword error statuses, and hence the frame error statuses, a favorable frame error status is that status indicating the lowest number of errors in its respective frame. Referring to FIG. 5, codewords from signal source 1 are chosen because their corresponding frame error status $FE_1$ is the most favorable. As before, when two or more frames have equally favorable frame error statuses, the selection of the codewords can be arbitrary. The second embodiment described above further conserves bandwidth in comparison with prior art methods by providing only frame error statuses, which frame error statuses require less bandwidth than the individual codeword error statuses.

The present invention provides a method, in a digital wireless communication system, for providing a favorable signal representation given a plurality of signal sources. With such a method, the bandwidth limitations of the prior art may be overcome. To this end, a reduced amount of error status information is sent to a comparator. In a first embodiment, codeword error statuses are provided only for those codewords having the greatest impact on audio quality, thereby allowing their direct comparison. Additionally, frame error statuses are used to select those codewords having a lesser impact on audio quality. In a second embodiment, only frame error statuses are provided.

We claim:

1. A method for providing a favorable signal representation, the method comprising the steps of:
   a) providing frames from a plurality of signal sources, wherein each of the frames comprises a plurality of codewords, each codeword of the plurality of codewords having a codeword identification;
   b) determining, for each frame, codeword error statuses that uniquely correspond to each codeword of the plurality of codewords;
   c) identifying, for each frame, a priority set of codewords and a non-priority set of codewords of the plurality of codewords, wherein the codeword error statuses are provided for the priority set of codewords and the codeword error statuses are not provided for the non-priority set of codewords;
   d) determining, for each frame, a frame error status based on the codeword error statuses;
   e) comparing the codeword error statuses for members of the priority set of codewords for each frame, wherein the members have substantially identical codeword identifications;
   f) selecting, responsive to the step of comparing the codeword error statuses, members having favorable codeword error statuses to produce selected priority codewords;
   g) comparing the frame error statuses for each frame;
   h) selecting, responsive to the step of comparing the frame error statuses, the non-priority set of codewords corresponding to a favorable frame error status to produce selected non-priority codewords; and
   i) providing the selected priority codewords and the selected non-priority codewords as the favorable signal representation.

2. The method of claim 1 further comprises the step of providing the frames, wherein the frames comprise compressed digital audio encoded with an IMBE™ (Improved Multi-Band Excitation) encoder.

3. The method of claim 1 further comprises the step of identifying the priority set of codewords based on a perceptual weight for each codeword of the plurality of codewords.

4. The method of claim 1 further comprises the step of determining the frame error status, wherein the frame error status comprises the sum of the codeword error statuses corresponding to the non-priority set of codewords.

5. The method of claim 4 further comprises the step of determining the frame error status, wherein the frame error status further comprises the sum of the codeword error statuses corresponding to the priority set of codewords.

6. In a wireless communication system that includes at least one communication unit, a plurality of base stations, and a comparator operably coupled to the plurality of base stations, a method for providing a favorable signal representation of a digital signal transmitted by the at least one communication unit, the method comprising the steps of:
   a) receiving, by at least two base stations of the plurality of base stations via a wireless communication resource, the digital signal;
   b) parsing, by the at least two base stations, frames of the digital signal, wherein each of the frames comprises a plurality of codewords, each codeword of the plurality of codewords having a codeword identification;
   c) determining, by each of the at least two base stations for each frame, codeword error statuses that uniquely correspond to each codeword of the plurality of codewords;
   d) determining, by each of the at least two base stations for each frame, a frame error status based on the codeword error statuses;
   e) transmitting, by each of the at least two base stations to the comparator, the frames comprising a priority set of codewords and a non-priority set of codewords of the plurality of codewords, wherein the codeword error statuses are provided for the priority set of codewords and the codeword error statuses are not provided for the non-priority set of codewords;
   f) comparing, by the comparator, the codeword error statuses for members of the priority set of codewords for each frame, wherein the members have substantially identical codeword identifications;
   g) selecting, by the comparator responsive to the step of comparing the codeword error statuses, members having favorable codeword error statuses to produce selected priority codewords;
   h) comparing, by the comparator, the frame error statuses for each frame;
   i) selecting, by the comparator responsive to the step of comparing the frame error statuses, the non-priority set of codewords corresponding to a favorable frame error status to produce selected non-priority codewords; and
   j) providing, by the comparator, the selected priority codewords and the selected non-priority codewords as the favorable signal representation.

7. The method of claim 6 further comprises the step of parsing the frames, wherein the frames comprise compressed digital audio encoded with an IMBE™ (Improved Multi-Band Excitation) encoder.

8. The method of claim 7 further comprises the step of parsing the frames, wherein the frames comprise seven codewords.

9. The method of claim 8 further comprises the step of determining, for each frame, the codeword error statuses using Golay error correction codes.

10. The method of claim 8 further comprises the step of determining, for each frame, the codeword error statuses using Hamming error correction codes.

11. The method of claim 6 further comprises the step of determining the frame error status, wherein the frame error status comprises the sum of the codeword error statuses corresponding to the non-priority set of codewords.

12. The method of claim 11 further comprises the step of determining the frame error status, wherein the frame error status further comprises the sum of the codeword error statuses corresponding to the priority set of codewords.

13. The method of claim 6 further comprises the step of identifying the priority set of codewords based on a perceptual weight for each codeword of the plurality of codewords.

14. In a wireless communication system, a method for a comparator to provide a favorable signal representation, the method comprising the steps of:

a) receiving frames, each of the frames comprising a priority set of codewords and a non-priority set of codewords, wherein codeword error statuses are provided for the priority set of codewords and codeword error statuses are not provided for the non-priority set of codewords;

b) comparing the codeword error statuses for members of the priority set of codewords for each frame, wherein the members have substantially identical codeword identifications;

c) selecting, responsive to the step of comparing the codeword error statuses, members having favorable codeword error statuses to produce selected priority codewords;

d) comparing the frame error statuses for each frame;

e) selecting, responsive to the step of comparing the frame error statuses, the non-priority set of codewords corresponding to a favorable frame error status to produce selected non-priority codewords; and f) providing the selected priority codewords and the selected non-priority codewords as the favorable signal representation.

15. In a wireless communication system, a method for a base station to provide at least one frame representing a digital signal, the method comprising the steps of:

a) receiving, via a wireless communication resource, the digital signal;

b) parsing the at least one frame of the digital signal, wherein the at least one frame comprises a plurality of codewords, .each codeword of the plurality of codewords having a codeword identification;

c) determining for the at least one frame, codeword error statuses that uniquely correspond to each codeword of the plurality of codewords;

d) determining, for the at least one frame, a frame error status based on the codeword error statuses; and e) providing the at least one frame comprising the frame error status, a priority set of codewords of the plurality of codewords, and a non-priority set of codewords of the plurality of codewords, wherein the codeword error statuses are provided for the priority set of codewords and the codeword error statuses are not provided for the non-priority set of codewords.

16. A method for providing a favorable signal representation, the method comprising the steps of:

a) providing frames from a plurality of signal sources, wherein each of the frames comprises a plurality of codewords, each codeword of the plurality of codewords having a codeword identification;

b) determining, for each frame, codeword error statuses that uniquely correspond to each codeword of the plurality of codewords;

c) determining, for each frame, a frame error status based on the codeword error statuses;

d) comparing the frame error statuses for each frame;

e) providing, responsive to the step of comparing, the plurality of codewords corresponding to a favorable frame error status as the favorable signal representation.

17. The method of claim 16 further comprises the step of determining the frame error status, wherein the frame error status comprises the sum of the codeword error statuses.

* * * * *